(No Model.)

G. A. BETANCOURT.
ROTARY PLOW.

No. 272,631. Patented Feb. 20, 1883.

WITNESSES:
Chas. Nida.
C. Sedgwick

INVENTOR:
G. A. Betancourt
BY Munn & Co
ATTORNEYS.

UNITED STATES PATENT OFFICE.

GASPAR A. BETANCOURT, OF HAVANA, CUBA.

ROTARY PLOW.

SPECIFICATION forming part of Letters Patent No. 272,631, dated February 20, 1883.

Application filed November 16, 1882. (No model.)

To all whom it may concern:

Be it known that I, GASPAR ALONSO BETANCOURT, a citizen of the United States, at present residing in Havana, Cuba, have invented a new and useful Improvement in Rotary Plows, of which the following is a full, clear, and exact description.

Reference is to be had to the accompanying drawings, forming part of this specification, in which similar letters of reference indicate corresponding parts in both the figures.

Figure 1:
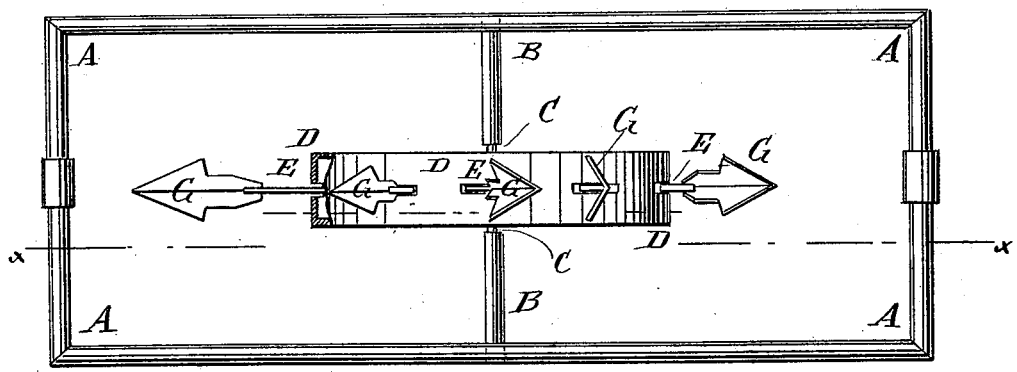
Figure 2:
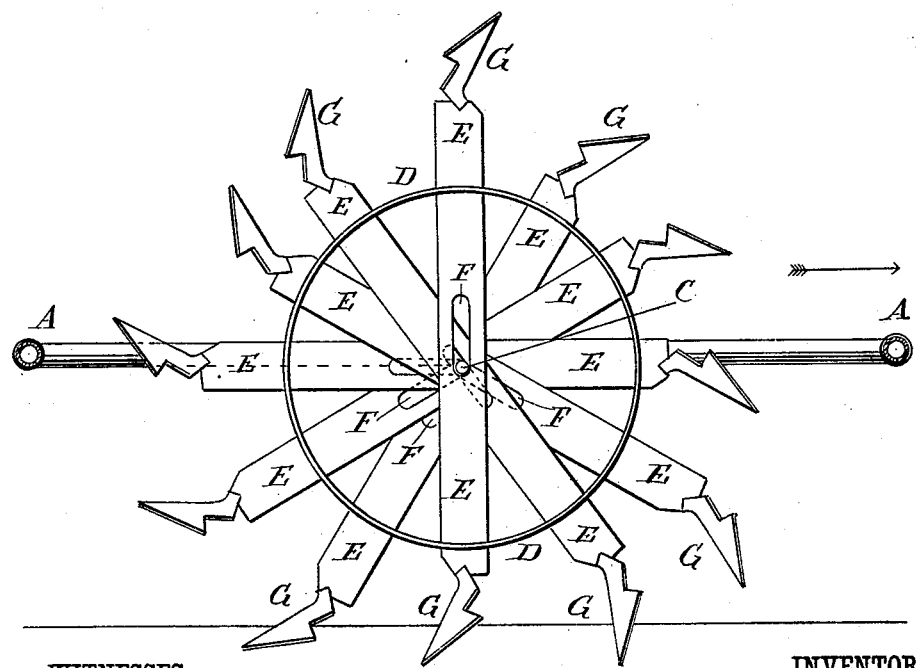

Figure 1 is a plan view of my improvement. Fig. 2 is a sectional side elevation of the same taken through the line $x$ $x$, Fig. 1.

The object of this invention is to facilitate the operation of plowing and promote thoroughness in loosening and mellowing the soil.

The invention consists in a rotary plow constructed with a drum mounted in a frame, and provided with slots in its shell, through which pass standards having a plow at each end, and provided with central longitudinal slots to receive the shaft of the said drum, whereby the movements of the said standards will be limited, as will be hereinafter fully described.

A is the frame of the machine, which is designed to be provided in the ordinary manner with appliances for the attachment of the draft and with handles for guiding the machine.

To the side bars of the frame A are attached bearings B, in which revolve the ends of a shaft, C. The shaft C passes through and is rigidly attached to the centers of the heads of a drum, D.

In the shell of the drum D are formed slots, through which pass diametrically the plow-standards E. The standards E cross each other in the middle part of the drum D, and have longitudinal slots F formed in their centers, through which the shaft C passes, so that the said standards E will have a longitudinal movement limited by the length of the slots F.

Upon both ends of each standard E are formed, or to them are attached, plows G with a slight inclination. The plows G at the opposite ends of the standards E incline in opposite directions, so that when the said plows are above the drum D they will incline forward, and when below the said drum they will incline to the rearward, as shown in Fig. 2. The plows G may be made in the form of shovel-plows, or of small double mold-board plows, as may be desired. With this construction, as the machine is drawn forward and each standard passes from a horizontal toward a vertical position, it slides downward at the forward side, and its lower plow comes in contact with the ground in nearly a vertical position and is forced into the ground by the weight of the machine, the standard at the same time sliding upward. As each standard E passes from a vertical toward a horizontal position it slides downward at the rear side, and at the same time its plow is raised through and raises the soil, leaving it loose and mellow.

Having thus described my invention, what I claim as new, and desire to secure by Letters Patent, is—

1. A rotary plow constructed substantially as herein shown and described, and consisting of a drum mounted in a frame, and provided with slots in its shell through which slide diametrically standards having a plow at each end, as set forth.

2. In a rotary plow, the combination, with the drum D, provided with slots in its shell, and the shaft C, of the diametrical standards E, having longitudinal slots F in their centers, and provided with a plow, G, at each end, substantially as herein shown and described, whereby the plows will be made to loosen and mellow the soil by the rotation of the said drum as it is drawn forward, as set forth.

3. In a rotary plow, the standards E, made, substantially as herein shown and described, with longitudinal slots F in their centers, and a plow, G, at each end, as set forth.

GASPAR A. BETANCOURT.

Witnesses:
L. V. SCHMIDT,
L. BETANCOURT.